Feb. 8, 1949.  R. C. EVANS  2,461,203
HAND TRUCK
Filed Nov. 14, 1946

INVENTOR:
*Ralph C. Evans,*
BY
*Bodell & Thompson*
ATTORNEYS.

Patented Feb. 8, 1949

2,461,203

UNITED STATES PATENT OFFICE 2,461,203

HAND TRUCK

Ralph C. Evans, Syracuse, N. Y.

Application November 14, 1946, Serial No. 709,704

2 Claims. (Cl. 214—65.4)

This invention relates to hand trucks for moving articles in shops, factories, stores, etc., and has for its object a construction by which the platform, or floor thereof, can be initially tilted with its front edge on the floor and the article raised to permit the platform to roll toward and under the article by means of a link operated by a crank or bail member mounted on an upright handle rigid with the platform, which crank or bail is movable upwardly in an arc out of a general horizontal position toward a vertical position.

The invention consists in the novel features and in the combinations and constructions hereinafter set forth and claimed.

In describing this invention, reference is had to the accompanying drawing in which like characters designate corresponding parts in all the views.

Figure 1:
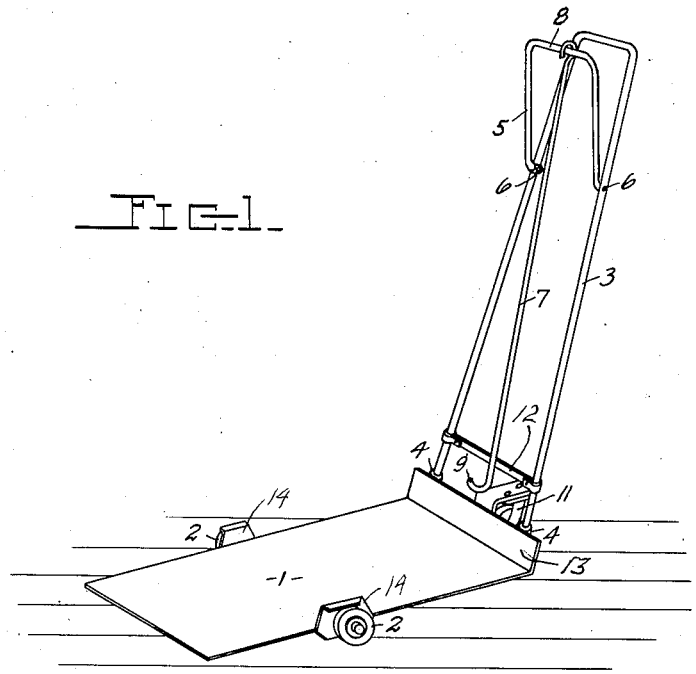
Figure 1 is a perspective view of a hand truck embodying this invention.

1 designates the platform having a pair of supporting wheels 2 located between its ends, or spaced apart from the front edge of the platform, the wheels being located in front of the transverse median line of the platform.

3 is a handle extending upward from the rear edge of the platform and rigid therewith, it being arranged at a slightly inclined angle relative thereto, the handle being shown as inverted U shape in general form, with the legs of the U formation secured, as at 4, to the platform.

5 is a crank member pivoted at 6 to the handle below the upper end thereof, the crank member being shown as in the form of a bail with the opposite sides thereof pivoted to the uprights of the rigid handle.

7 is a link connected to the intermediate portion 8 of the bail, the link having means, as a hook 9 of any suitable shape, at its lower end for engaging an article to be loaded on the platform. The link is here shown as formed with an eye at its upper end around the intermediate portion of the bail 5 so that the link has a swinging movement laterally as well as forward and rearward, that is a universal swinging movement.

The article 10, here shown, is what is usually called in factories, or shops, a tote box, or tote pan. The truck is usually provided with a caster wheel 11 on a bracket projecting rearwardly from the rear edge of the platform.

The uprights of the handle 3 converge upwardly slightly toward each other, and a transverse brace member 12 is arranged between them toward their lower ends, this being slidable along the same so that when it is pressed down to its full extent it spreads, or exerts a spreading strain outwardly, causing the lower end of the uprights of the handle 3 to be securely held at 4 in sockets on the rear edge of the platform, or an upwardly extending flange 13 thereon. This cross member also acts as a rest for the link 7. Also the brackets 14, at the sides of the platform in which the axle for the wheels 2 are mounted, extend above the face of the platform providing guides, or stops, for the articles, or tote boxes, loaded on the platform.

Figure 2:
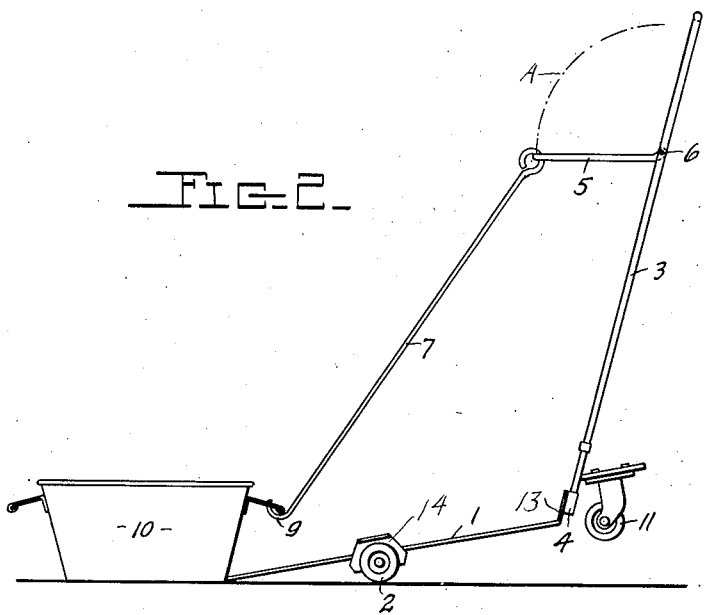
Figure 2 is a side elevation showing the position thereof when the platform is tilted preliminary to loading an article thereon.

In operation, the truck is moved to the article and operated to tilt the platform 1 into the position shown in Figure 2 wherein the front edge of the truck is on the floor adjacent the article. Then the crank member 5 is swung into horizontal position and the link 7 swung so that its lower hook shaped end coacts with the article 10 at one end thereof. Then, the crank is swung in an arc A from the position shown in Figure 2 in which the crank is substantially horizontal in an upwardly and rearwardly extending arc, so that at the first part of this movement the end of the article against the front end of the platform is lifted up and then, during continued pivotal movement of the crank, one end continues to be elevated slightly and the article is loaded by the combination of the forward movement of the platform and the rearward movement of the article. This loading movement continues until the center of gravity of the article approaches the transverse median line of the platform, or the vertical plane of the axis of the wheels 2 when the platform tilts back to horizontal position. With the loaded truck now in horizontal position, the hook link 7 automatically disengages from the article and assumes a position against the transverse bar or rest 12, and with the bail 5 against the rigid handle 3. The loaded truck may then be pushed, or pulled, to any desired location. Unloading the article from the platform is accomplished by tilting the truck about the wheels 2 to cause the article to slide forward to contact the floor, after which the truck can be withdrawn.

Owing to the universal pivotal movement of the link 7, the link can be swung laterally to engage the tote box without being in line therewith and, during the upward movement of the crank or bail 5, the box and the truck will take a relative movement, whereby they become alined during the operation of the bail 5.

What I claim is:

1. A hand truck including a platform, wheels supporting the same between the front and rear edges thereof, a rigid handle extending upward from the rear edge of the platform, a crank pivotally mounted on the handle on a horizontal axis and extending forwardly and horizontally therefrom, and a link depending from the handle for connection to an article to be lifted from the floor onto the platform, the crank being arranged to swing upwardly from a horizontal position and rearwardly toward a vertical position into a position in line and alongside the upper end portion of the rigid handle during the loading of the article on the platform.

2. A hand truck including a platform, wheels supporting the same spaced from the front edge thereof so that the platform is tiltable, a rigid handle extending upwardly from the rear edge of the platform, the handle being inverted U-shaped in general form, a crank in the form of a bail pivoted at its ends to opposite sides of the inverted U formation, and a link for coacting with the article to be lifted and transported pivotally mounted on the intermediate part of the bail, the bail being mounted to swing from the horizontal position in an arc toward vertical position during the lifting movement of the article onto the platform into a position alongside the upper end portion of the rigid handle.

RALPH C. EVANS.

REFERENCES CITED

The following references are of record in the file of this patent:

UNITED STATES PATENTS

| Number | Name | Date |
| --- | --- | --- |
| 590,436 | Marvel et al. | Sept. 21, 1897 |
| 649,932 | Hodges | May 22, 1900 |
| 1,537,156 | Baxter | May 12, 1925 |
| 1,839,317 | Jankisz | Jan. 5, 1932 |
| 2,215,529 | Nazarko | Sept. 24, 1940 |
| 2,245,543 | Landsman et al. | June 10, 1941 |
| 2,360,799 | Slingsby | Oct. 17, 1944 |